(12) United States Patent
Lin (10) Patent No.: US 7,873,114 B2
(45) Date of Patent: Jan. 18, 2011

(54) METHOD AND APPARATUS FOR QUICKLY DETECTING A PRESENCE OF ABRUPT NOISE AND UPDATING A NOISE ESTIMATE

(75) Inventor: Hai-Tao Lin, Beijing (CN)

(73) Assignee: Motorola Mobility, Inc., Libertyville, IL (US)

( * ) Notice: Subject to any disclaimer, the term of this patent is extended or adjusted under 35 U.S.C. 154(b) by 936 days.

(21) Appl. No.: 11/693,028

(22) Filed: Mar. 29, 2007

(65) Prior Publication Data

US 2008/0240282 A1 Oct. 2, 2008

(51) Int. Cl.
  *H04B 15/00* (2006.01)
(52) U.S. Cl. .................... 375/285; 375/346; 455/296; 704/226
(58) Field of Classification Search .............. 375/285, 375/346; 455/296; 704/226
  See application file for complete search history.

(56) References Cited

U.S. PATENT DOCUMENTS 5,659,622 A * 8/1997 Ashley .................. 381/94.1
5,809,455 A * 9/1998 Nishiguchi et al. .......... 704/214
6,366,880 B1 * 4/2002 Ashley ................. 704/226
6,868,378 B1 * 3/2005 Breton ................ 704/233
2004/0102967 A1 * 5/2004 Furuta et al. ............. 704/226
2008/0281589 A1 * 11/2008 Wang et al. ............ 704/226

OTHER PUBLICATIONS

Cohen, "Speech Enhancement For Non-Stationary Noise Environments," Signal Processing 81, 2001, pp. 2403-2418.

* cited by examiner

*Primary Examiner*—Chieh M Fan
*Assistant Examiner*—Siu M Lee (57) ABSTRACT

An apparatus (100) and method (200) for detecting the presence of abrupt noise is provided. The method can include estimating (210) a subband energy of the signal, calculating (220) a peak-to-peak energy difference (345), and calculating (230) a spectrum deviation (426). A request to update a noise channel estimate can be declared if a) a total estimated channel energy is greater than a predetermined noise floor (442), and b) the spectrum deviation is less than a predetermined variance threshold (444), and c) the peak-to-peak energy difference is less than a predetermined peak-to-peak threshold (446), or d) if a voice metric is less than a voice level threshold (448).

20 Claims, 8 Drawing Sheets

METHOD AND APPARATUS FOR QUICKLY DETECTING A PRESENCE OF ABRUPT NOISE AND UPDATING A NOISE ESTIMATE

FIELD OF THE INVENTION

The present invention relates to mobile communication devices, and more particularly, to noise suppression systems in mobile communication devices.

BACKGROUND OF THE INVENTION

Figure 1:
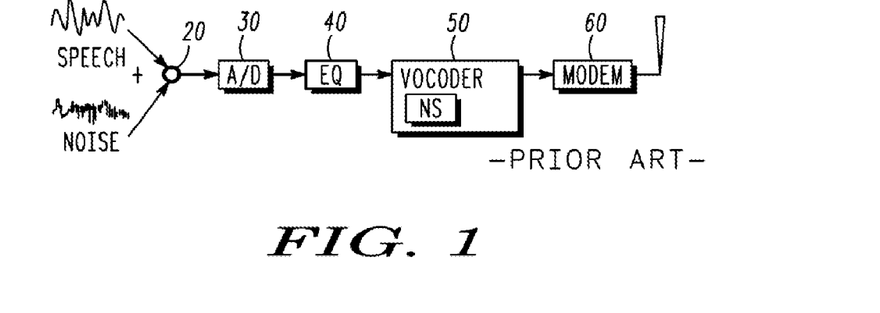
FIG. 1 is a block diagram of an exemplary mobile communication device having an adaptive noise suppressor.

Mobile communication devices, such as a cell phone or radio, are used primarily for voice communication. In certain environments, speech may be contaminated with unwanted noise. The noise may be background noise, such as car noise, street noise, or babble noise, that is audibly present in the environment and that degrades the intelligibility of the speech. Mobile communication devices generally include a noise suppressor for suppressing unwanted noise in the speech. The noise suppressor may be a stand-alone module, or a module integrated within a vocoder. As shown in FIG. 1, a mobile communication device generally includes a microphone 20 for capturing speech, an analog to digital converter 30 for generating a digital signal from the speech, an equalizer 40 for adjusting an equalization of the digital signal, a vocoder 50 for compressing the equalized signal, and a modem 60 for transmitting the compressed signal. The input to the microphone 20 may consist of speech and unwanted noise. The vocoder 50 can include an internal noise suppressor 100 that suppresses unwanted noise, such as background noise, in the input signal.

A vocoder 50, such as the Enhanced Variable Rate Coder (EVRC), is a voice compression system used with the International Standard (IS-95) Rate 1 CDMA interface. The EVRC employs an adaptive noise suppressor (NS) 100 for suppressing unwanted noise in an input signal. The adaptive NS 100 is based on a spectral subtraction technique that effectively subtracts a noise estimate from the input signal. The adaptive NS 100 requires a good estimate of the noise to achieve acceptable noise suppression. The noise can be estimated during times of silence, or non-speech activity. The adaptive NS 100 relies on an assumption that the noise (generally background noise) is stationary or slowly varying non-stationary. This allows the adaptive NS 100 to generate a reliable estimate of the noise during non-speech activity.

However, when a rapidly varying or abrupt noise is introduced to the input signal, the adaptive NS 100 misinterprets the noise as speech. Consequently, the adaptive NS 100 does not update the noise estimate nor immediately suppress the noise. As a result, the adaptive NS 100 can only suppresses noise in accordance with a previous noise estimate. This delay in immediately recognizing the noise leaves much noise that is unsuppressed for a significant period afterwards. Over time the adaptive NS 100 will recognize the noise, update an estimate of the noise, and begin the noise suppression process. However, during this time, the unwanted noise is audible and present in the compressed speech signal. A need therefore exists for improving the detection and suppression of abrupt noise in a signal.

SUMMARY

One embodiment is a method for detecting noise in a signal. The method can include estimating a subband energy of the signal to produce an estimated channel energy over a pre-specified time window, calculating a peak-to-peak energy difference between a maximum subband energy and a minimum subband energy of the estimated channel energy, and calculating a spectrum deviation of the signal as a difference between the estimated channel energy and a long-term channel energy. A presence of noise and a request to update a noise channel estimate can be declared if a) a total estimated channel energy is greater than a predetermined noise floor, b) the spectrum deviation is less than a predetermined variance threshold, and c) the peak-to-peak energy difference is less than a predetermined peak-to-peak threshold.

Another embodiment is an apparatus for detecting noise in a signal. The apparatus can include a frequency domain converter that represents the signal as a plurality of energy channels in a frequency domain of the signal, a channel energy estimator that produces an estimated channel energy, and a spectral deviation estimator that calculates a peak-to-peak energy difference between a maximum subband energy and a minimum subband energy of the estimated channel energy and calculates a spectrum deviation of the signal as a difference between a long-term channel energy and the estimated channel energy. The apparatus can include a background noise estimator that estimates a noise channel energy, an a noise update detector that declares the presence of noise based on the peak-to-peak energy difference and the spectral deviation.

Yet another embodiment is a method for detecting noise in a signal, suitable for use in a spectral subtraction based noise suppressor. The method can include estimating a subband energy of a frame of the signal to produce an estimated channel energy, calculating a spectrum deviation of the signal as a difference between the estimated channel energy and a long-term channel energy, evaluating a ratio between a maximum subband energy and a minimum subband energy of the estimated channel energy, incrementing a noise update count if the ratio is less than a predetermined threshold, and updating a noise channel energy if the noise update count is greater than an update count threshold. The method can further include estimating a channel SNR from the estimated channel energy and the noise channel energy, and applying a spectral gain scaling to the estimated channel energy in accordance with the SNR to suppress the noise. The spectral subtraction based noise suppressor can be integrated in an enhanced variable rate coder (EVRC) to comply with an IS-95x CDMA interface.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppress", as used herein, is defined as partially or wholly attenuating noise within a signal. The term "abrupt noise", as used herein, is defined as high energy noise with a relatively flat or approximately uniform noise spectrum.

Broadly stated, embodiments of the invention are directed to a method and apparatus for detecting a presence of abrupt noise in a signal. Abrupt noise is generally characterized as a rapidly varying high energy signal with a relatively flat noise spectrum. The method and apparatus can update a noise estimate in response to the detecting for quickly suppressing the abrupt noise. Briefly, two metrics are introduced within a noise decision logic for declaring a presence of abrupt noise. First, a ratio between a maximum subband energy value and a minimum subband energy value within a specified time window is determined to characterize the signal as speech or noise. The ratio is a first metric employed in the noise update logic. This ratio is compared with a certain threshold, where a smaller ratio indicates the absence of speech. Secondly, a spectral deviation is calculated that identifies spectral characteristics of the input signal. The spectral deviation is a second metric employed in the noise update logic. Noise is declared present when the spectral deviation is less than a predetermined amount and if the overall signal energy is above an energy threshold.

The novel method of speech detection herein presented, introduces a peak-to-peak energy difference metric (e.g. ratio) and a spectral deviation metric within a noise update decision logic for improving detection of abrupt noise. In particular, the two metrics are used to increase an update count of noise frames in the noise update decision logic. The method when combined with the noise update decision in a noise suppression system, such as the EVRC NS, allows for quick detection, quick updating of the noise estimate, and tracking of abrupt noise. As a result, the noise suppressor can quickly respond to changes in noise and update a noise estimate. The updated noise estimate can be subtracted from the original signal to quickly suppress the abrupt noise thereby enhancing the user listening experience.

Figure 2:
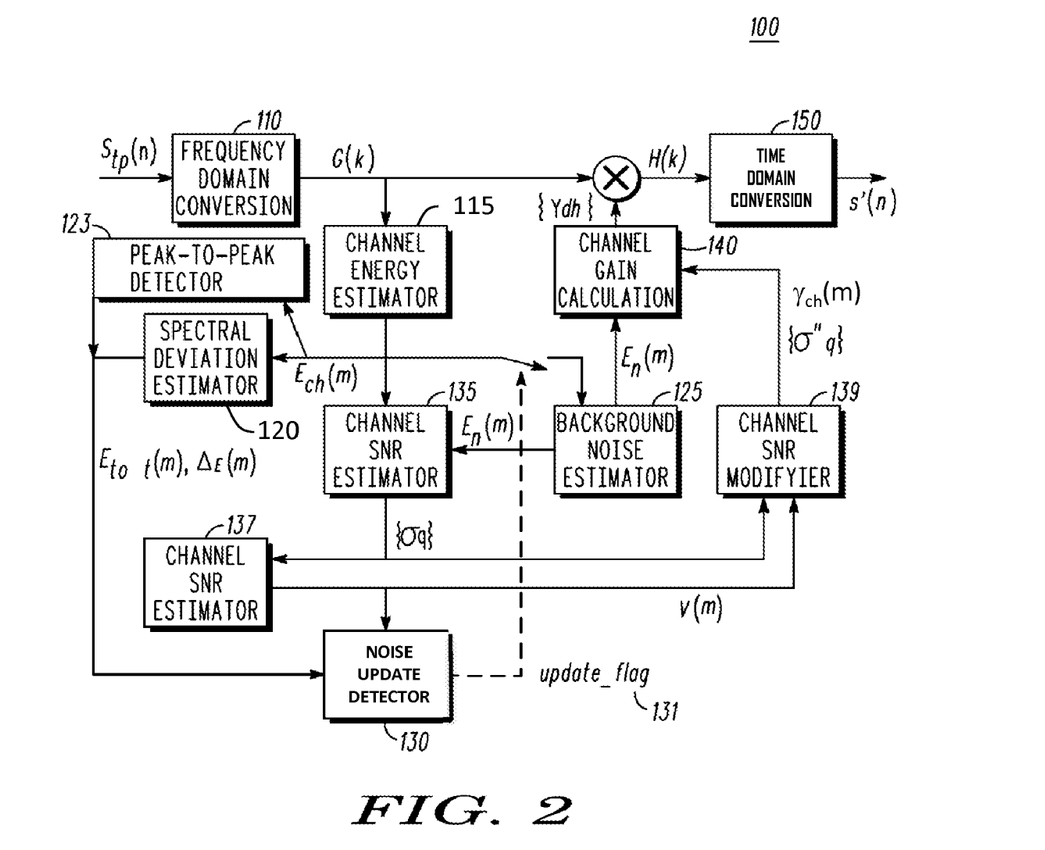
FIG. 2 is a block diagram of an adaptive noise suppressor that suppresses abrupt noise in accordance with the embodiments of the invention.

Referring to FIG. 2, an adaptive noise suppressor (NS) 100 in accordance with the embodiments of the invention is shown. The adaptive NS 100 includes a frequency domain converter 110 that represents the input signal s(n) as a plurality of gain channels G(k) in a frequency domain of the input signal. The input signal s(n) may be high-pass filtered $s_{HP}(n)$ to remove low energy noise or to adjust a spectral tilt of the input signal in accordance with a vocoder input requirement. The channel energy estimator 115 is operatively coupled to the frequency domain converter 110 and produces an estimated channel energy $E_{ch}(m)$ from the input signal $s_{HP}(n)$. The spectral deviation estimator 120 is operatively coupled to the channel energy estimator 115 and calculates a spectrum deviation $\Delta_E(m)$ of the estimated channel energy $E_{ch}(m)$. The peak-to-peak detector 123 is operatively coupled to the channel energy estimator and estimates a peak-to-peak energy difference $\Delta_{P-P}(m)$ in the estimated channel energy $E_{ch}(m)$. The background noise estimator 125 is cooperatively coupled to the channel energy estimator 115 and estimates a noise channel energy, $E_N(m)$, during periods of silence, or non-speech activity, in the input signal. A noise update detector 130 is operatively coupled to the spectral deviation estimator 120, the peak-to-peak detector 123, and the channel energy estimator 115. The noise update detector 130 declares a presence of noise in the input signal $s_{HP}(n)$, based on the peak-to-peak energy difference $\Delta_{P-P}(m)$ and the spectral deviation $\Delta_E(m)$ calculated by the peak-to-peak detector 123 and the spectral deviation estimator 120, respectively. Briefly, these two metrics identify the presence of abrupt noise and are used in conjunction with a noise update decision logic of the noise update detector 130 to update a count of noise frames.

The adaptive noise suppressor (NS) 100 also includes a channel signal-to-noise (SNR) ratio estimator 135 operatively coupled to the channel energy estimator 115, the background noise estimator 125, and the noise update detector 130. The channel SNR ratio estimator 135 estimates a SNR from the estimated channel energy $E_{ch}(m)$ and the noise channel energy $E_N(m)$. A channel gain module 140 is cooperatively coupled to the channel (SNR) ratio estimator 135 and the background noise estimator 125. The channel gain module 140 applies a spectral gain scaling $\gamma_{ch}(m)$ to the plurality of energy channels (m) in accordance with the SNR to suppress the abrupt noise. A voice metric module 137 is operatively coupled to the channel SNR estimator 135 and determines a voicing level of the input signal. The voicing level identifies a periodicity of the input signal which is generally absent in abrupt noise. A channel SNR modifier 139 is operatively coupled to the voice metric module 137 and the channel gain module 140. The channel SNR modifier 139 determines the spectral gain scaling $\gamma_{ch}(m)$ in view of the voicing level. A time domain converter 150 is operatively coupled to the channel (SNR) ratio estimator 135 and the frequency domain converter 110. The time domain converter 150 converts the plurality of energy channels that have been gain-scaled to a time domain signal s(n).

Figure 3:
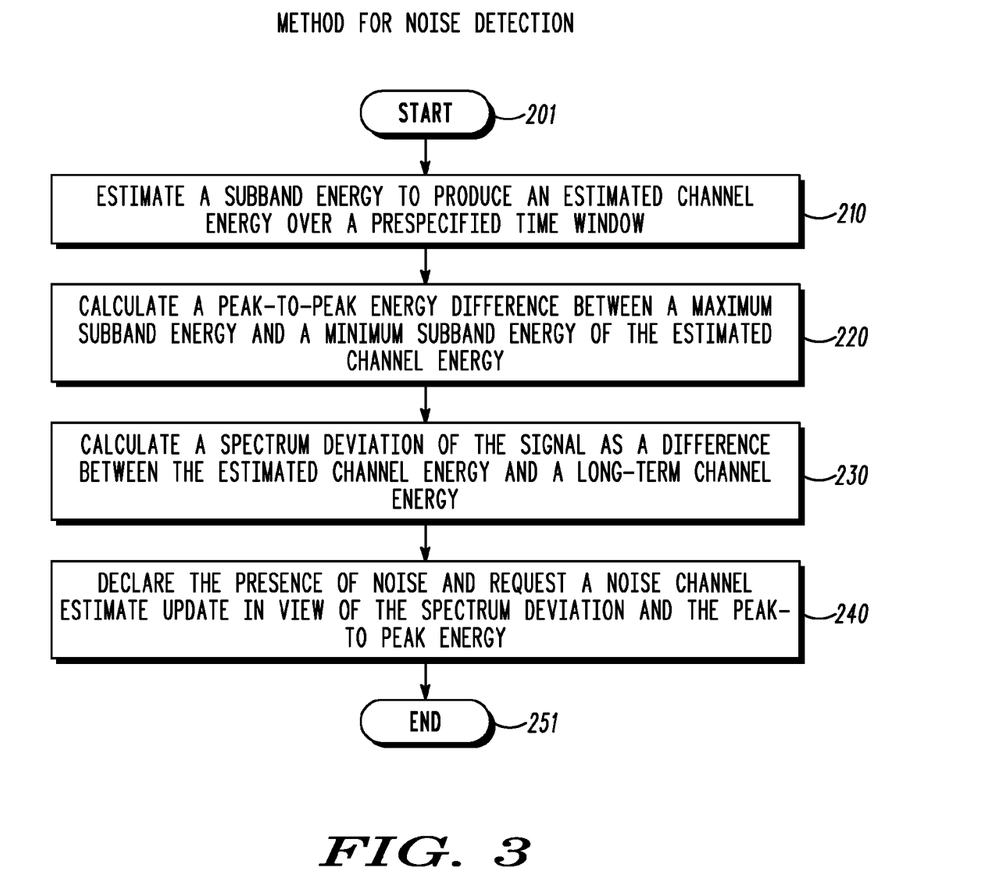
FIG. 3 is a method for detecting the presence of noise in accordance with the embodiments of the invention.

Referring to FIG. 3, a method 200 for detecting the presence of noise in a signal is provided. The method 200 can be practiced with more or less than the number of steps shown. To describe the method 200, reference will be made to FIGS. 2, and 4-9, although it is understood that the method 200 can be implemented in any other manner using other suitable components. In addition, the method 200 can contain a greater or a fewer number of steps than those shown in FIG. 3.

At step 201, the method 200 can start. At step 210, a subband energy can be estimated to produce an estimated channel energy over a pre-specified time window. A subband energy is an energy of the input signal within a frequency band. The pre-specified time window corresponds to a frame size of the input signal. As an example, the input signal can be represented as a series of 10 ms frames but can be any other frame size. Referring back to FIG. 2, the frequency domain converter 110 can to produce a magnitude signal spectrum, and the channel energy estimator 115 can perform a filter-bank operation on the signal spectrum to calculate an estimated channel energy.

Figure 4:
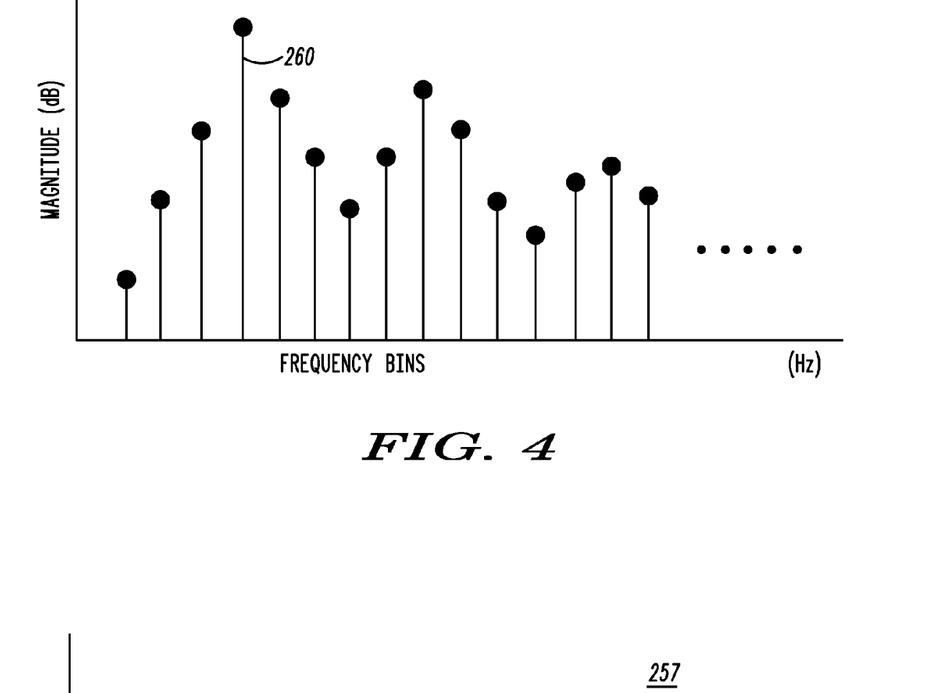
FIG. 4 illustrates a frequency representation of an input signal in accordance with the embodiments of the invention.
Figure 5:
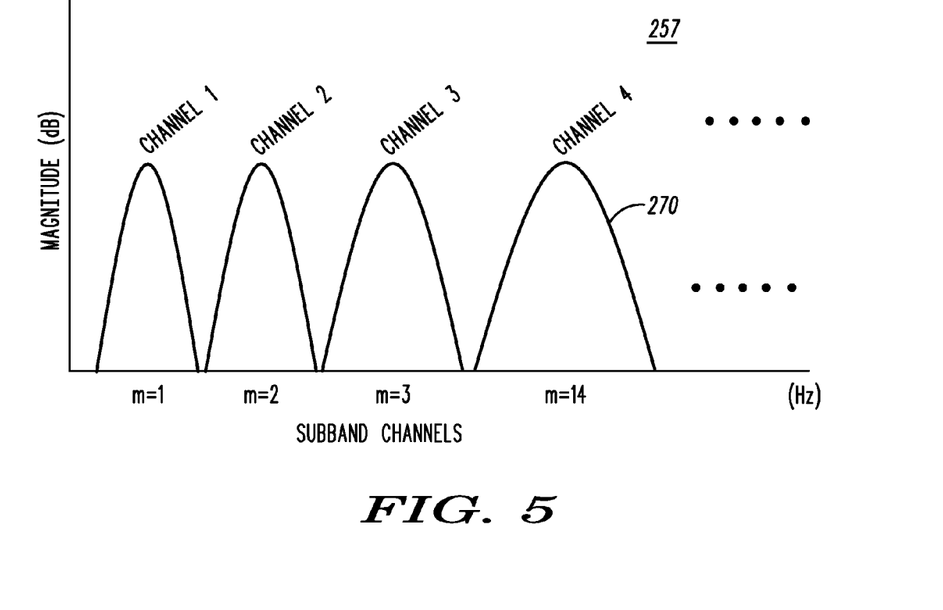
FIG. 5 illustrates channels of the frequency representation of FIG. 4 a in accordance with the embodiments of the invention.

Briefly, referring to FIG. 4, an illustration of an FFT magnitude spectrum of a frame of the input signal is shown. Notably, the input signal is represented as a sequence of frequency bins 260. As shown in FIG. 5, the frequency bins 260 can be categorized into non-overlapping (or overlapping) channels (m) 270 to produce the estimated channel energy 257. The non-overlapping channels can approximate critical bands having bandwidths that increase with frequency. The sum of the frequency bins 260 within each channel 270 represents the subband energy of the estimated channel energy 257. As an example, the channel energy estimator 115 can perform a Fast-Fourier transform (FFT) on the input signal to produce a frequency spectrum with a plurality of frequency bins 260, categorize the frequency bins 260 into a plurality of energy channels 270, and calculate a mean magnitude (dB) for frequency bins 260 within each channel 270 (e.g. m=1) to produce a subband energy (dB) for each channel. Notably, other methods for calculating a frequency spectrum, such as filter-bank methods, are herein contemplated.

Returning back to FIG. 3, at step 220, a peak-to-peak energy difference between a maximum subband energy and a minimum subband energy of the estimated channel energy can be calculated. In practice, the peak-to-peak detector 123 identifies the maximum subband energy channel and the minimum subband energy channel of the estimated channel energy 257 for a frame of speech, and calculates the absolute difference. As one example, the channel energy estimator 115 can identify a maximum subband channel energy (dB), identify a minimum subband channel energy, and subtract the minimum subband channel energy from the maximum subband channel energy to produce the peak-to-peak energy difference $\Delta_{P-P}(m)$. The channel energy estimator 115 can also apply an exponential windowing factor to the average long-term channel energy over time to smooth the spectrum deviation.

Figure 6:
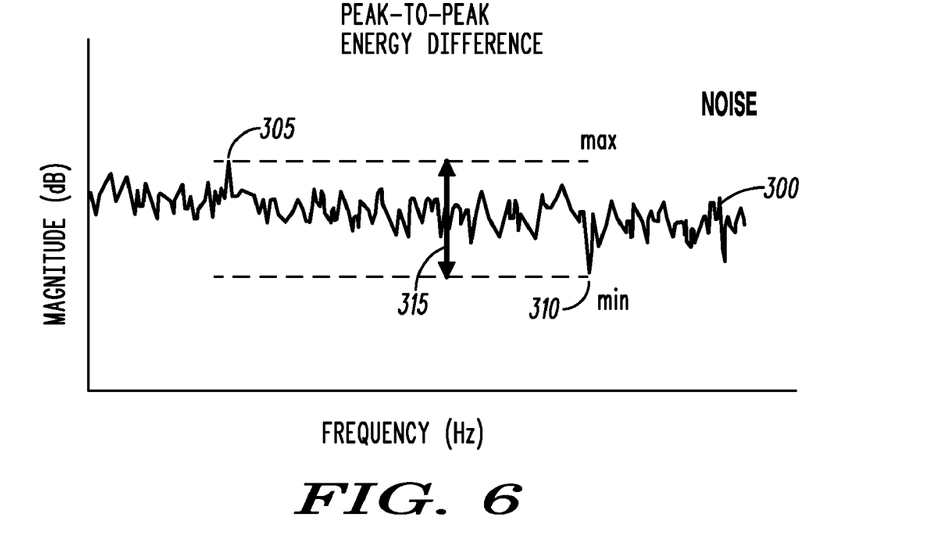
FIG. 6 illustrates a peak-to-peak energy difference for a noise spectrum in accordance with the embodiments of the invention.
Figure 7:
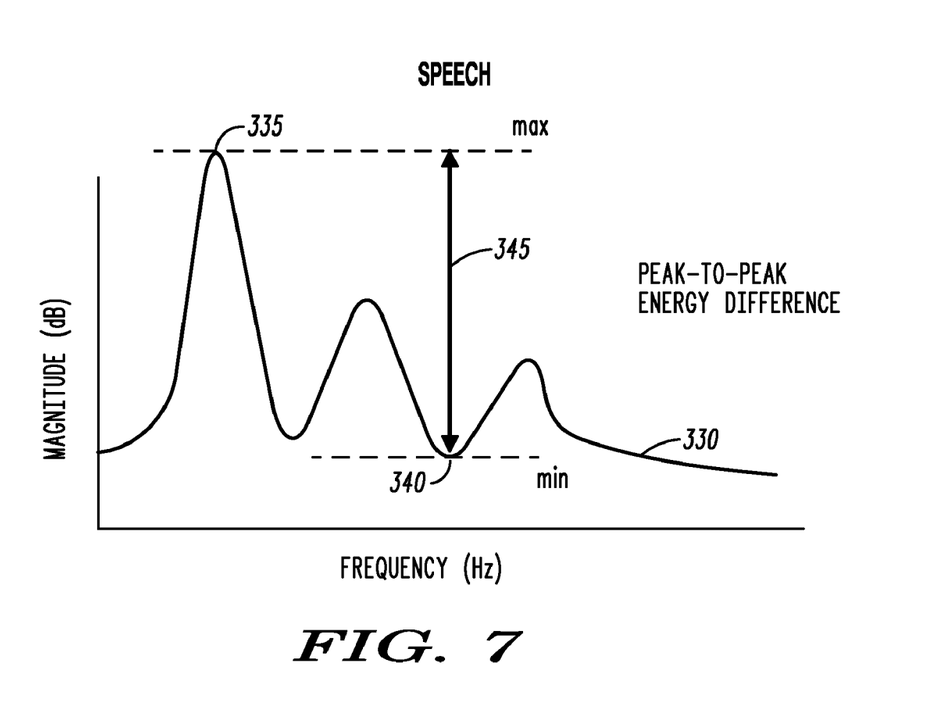
FIG. 7 illustrates a peak-to-peak energy difference for a speech spectrum in accordance with the embodiments of the invention.

Referring to FIG. 6, a plot illustrating the peak-to-peak energy difference $\Delta_{P-P}(m)$ of the estimated channel energy 257 for a noise spectrum 300 is shown. The noise spectrum 300 is relatively flat with minimal variation which is characteristic of most background noise. Accordingly, a peak-to-peak energy difference $\Delta_{P-P}(m)$ 315 between a maximum energy channel 305 and a minimum energy channel 310 is relatively small. In contrast, referring to FIG. 7, a plot illustrating the peak-to-peak energy difference $\Delta_{P-P}(m)$ of the estimated channel energy 257 for a speech spectrum 330 is shown. The speech spectrum 330 has areas of high energy corresponding to the formants speech. Briefly, during the articulation process, a user during speech production creates resonances and nulls in the vocal tract over time that forms the spectral characteristics of speech. Accordingly, a speech spectrum 330 tends to have greater peak-to-peak energy differences than a noise spectrum 300. As shown in FIG. 7, a peak-to-peak energy difference 345 $\Delta_{P-P}(m)$ between a maximum energy channel 335 and a minimum energy channel 340 for a speech spectrum is large compared to the peak-to-peak energy difference 315 $\Delta_{P-P}(m)$ of the noise spectrum.

Returning back to FIG. 3, at step 230, a spectrum deviation of the signal can be calculated as a difference between the estimated channel energy and a long-term channel energy. The long-term channel energy can be a running average of the estimated channel energy for each frame. In practice, the spectral deviation estimator 120 identifies a variance for each subband energy channel 270 (m) over time, and calculates the absolute changes in the variance. In practice, the spectral deviation estimator 120 calculates an absolute difference between an average long-term channel energy (dB) and a current channel energy (dB) for each channel 270, and sums the absolute differences for the plurality of channels to produce the spectrum deviation. The spectral deviation estimator 120 can also smooth the frequency bin estimates over time to reduce variation in assessing the subband channel energy. For example, spectral deviation estimator 120 can apply an exponentially weighted low-pass filter to the plurality of channels over time to smooth the estimated channel energy.

Figure 8:
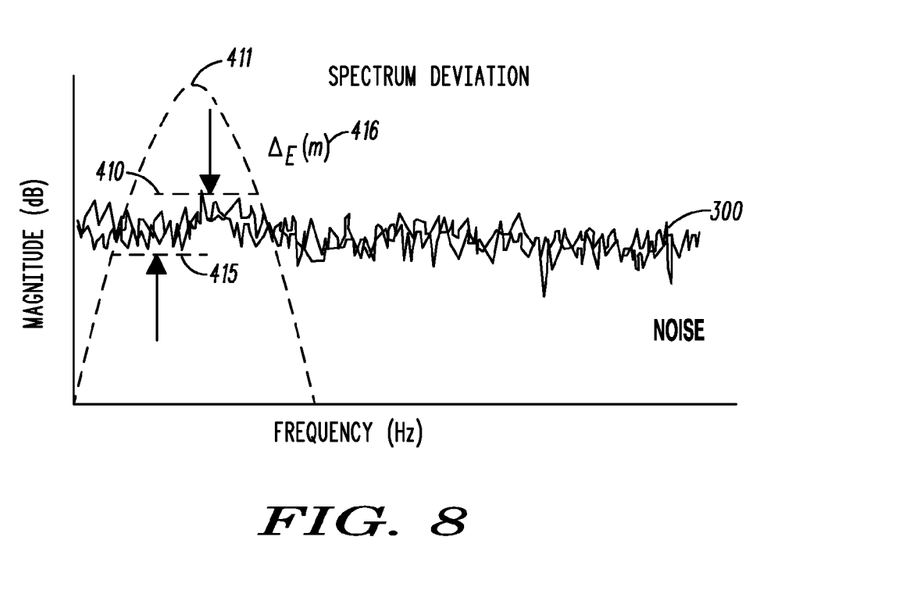
FIG. 8 illustrates a spectrum deviation for a noise spectrum in accordance with the embodiments of the invention.
Figure 9:
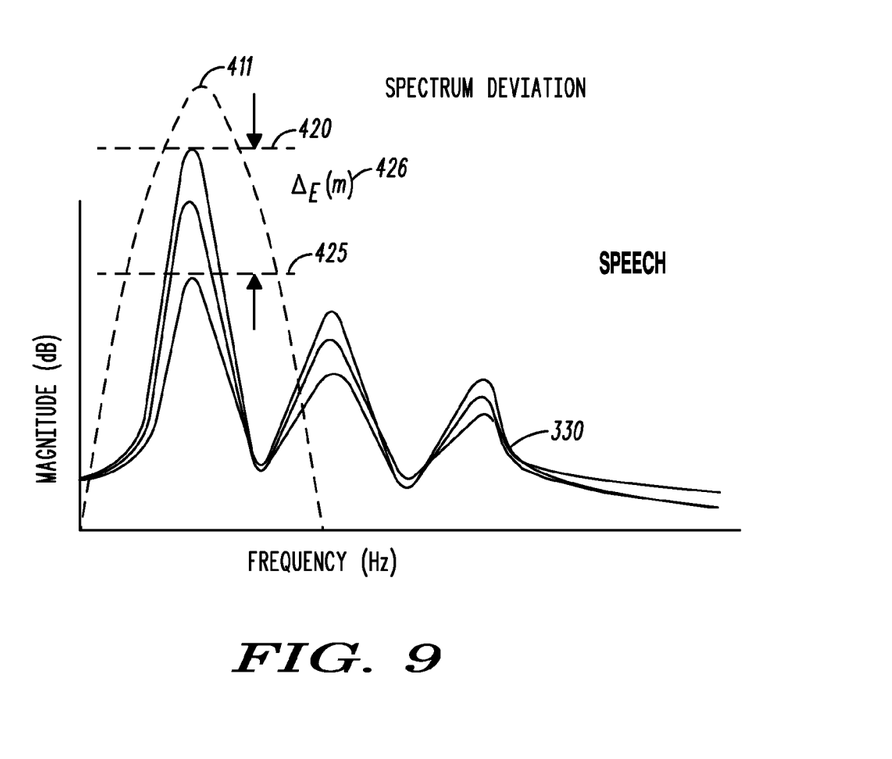
FIG. 9 illustrates a spectrum deviation for a speech spectrum in accordance with the embodiments of the invention.

Referring to FIG. 8, a plot illustrating a noise spectrum deviation $\Delta_E(m)$ 416 of the estimated channel energy 257 for a noise spectrum 300 is shown. The noise spectrum deviation $\Delta_E(m)$ 416 is the change in variance within a channel 411 (e.g. m=1) over time. As illustrated, the noise spectrum deviation $\Delta_E(m)$ 416 for the noise spectrum in channel m=1 is an averaged difference between an upper bound 410 and a lower bound 415. A spectrum deviation can be calculated for each channel and averaged for the frame. In general, a background noise spectrum exhibits lower spectral deviation than a speech spectrum. For example, referring to FIG. 9, a plot illustrating a speech spectrum deviation $\Delta_E(m)$ 426 of the estimated channel energy 257 for a speech spectrum 330 is shown. The speech spectrum deviation $\Delta_E(m)$ 426 is between an upper bound 420 and a lower bound 425. The speech spectrum deviation is evaluated over multiple frames thereby identifying variances in each subband channel 411 (m=1). Notably, the speech spectrum deviation $\Delta_E(m)$ 426 is considerably larger than the noise spectrum deviation $\Delta_E(m)$.

Returning back to FIG. 3, at step 240, a presence of noise can be declared and a request for a noise channel estimate update can be made in view of the spectrum deviation and the peak-to-peak energy. In practice, the peak-to-peak detector 123 calculates and determines if the peak-to-peak energy difference $\Delta_{P-P}(m)$ is less than an energy threshold. The spectral deviation estimator 120 calculates and determines if the spectrum deviation $\Delta_E(m)$ is less than a deviation threshold. The noise update detector 130 requests an update to an channel noise estimate if these two conditions are met. The $\Delta_{P-P}(m)$ criteria and the $\Delta_E(m)$ criteria are supplemental criteria to a noise update logic section within the noise update detector 130. At step 251, the method 200 can end.

Briefly, referring back to FIG. 2, the noise update decision module 130 determines when the noise estimate should be updated. During operation, the noise update decision module 130 counts the number of frames that are considered non-speech, and updates the noise channel estimate if the number of frames exceeds an update count threshold. In normal operation, the noise update decision module 130 updates the noise channel estimate based on criteria including determining if a voicing level metric level is below a threshold, or determining if a total subband channel energy is greater than a noise floor. The novel aspects of the invention herein extend the noise update logic criteria to include measures of spectrum deviation $\Delta_E(m)$ and peak-to-peak energy differences $\Delta_{P\text{-}P}(m)$.

In particular, the method 200, is implemented in the noise update decision module 130 to update the existing decision logic. More specifically, the noise estimate update logic is extended to include two criteria determining whether 1) the spectrum deviation $\Delta_E(m)$ is greater than an adaptive deviation threshold, and 2) the peak-to-peak energy difference $\Delta_{P\text{-}P}(m)$ is less than a predetermined threshold. Notably, both criteria must be met to request an update to the noise estimate. In accordance with the embodiments of the invention, the spectral deviation estimator 120 and peak-to-peak detector 123 introduce these two criteria for detecting abrupt noise having large spectral variance and large peak-to-peak energy difference as will be explained in the foregoing and in more detail.

Referring back to FIG. 2, a more detailed review of the adaptive NS 100 is now provided. In one mode of configuration, the adaptive NS operates on 10 ms per frame basis (80 samples at Fs=8 KHz). The input signals first pass through a six-order Butterworth high pass filter whose cut-off frequency is 120 Hz. This adaptive NS 100 reduces a large amount of energy for noises having primarily low frequency while keeping the speech quality at the same level. To avoid the discontinuity at a frame boundary, the adaptive NS 100 uses overlap-added method with 24 samples of the adjacent frames, 24 zeros padded and a trapezoidal window which forms a 128 samples vector. The frequency domain conversion module 110 sends the samples through a 128 point Fast Fourier Transform (FFT). The channel energy estimator 115 then groups the 128 outputs into m=16 channels (See FIG. 5), approximating non-overlapping critical bands. The channel energy estimator 115 calculates the mean magnitude for all frequency bins within a channel in accordance with EQ 1. The channel energy estimator 115 can also apply an exponential average with the former calculated results to estimate the energy presented in each channel, $E_{ch}(m,i)$.

$$E_{ch}(m, i) = \max\left\{E_{min}, \alpha_{ch}(m)E_{ch}(m-1, i) + (1-\alpha_{ch}(m))\frac{1}{f_H(i) - f_L(i) + 1}\sum_{k=f_L(i)}^{f_H(i)} |G(k)|^2\right\} \ 0 \leq i < N_c \quad (1)$$

where m is current frame, i is the channel index, $E_{min}$ is the minimum allowable channel energy, $\alpha_{ch}(m)$ is the channel energy smoothing factor, $N_c=16$ is the number of combined channels, and $f_L(i)$ and $f_H(i)$ are the i-th elements of the respectively low and high channel.

The channel SNR estimator 135 then combines the channel energy $E_{ch}(m,i)$ with an estimated channel noise energy $E_N(m,i)$ to calculate the channel SNR, $\sigma_q(i)$, estimated in dB units using EQ 2.

$$\sigma_q(i) = \min\left\{0, \min\left\{89, \text{round}\left\{10 \log_{10}\left(\frac{E_{ch}(m, i)}{E_n(m, i)}\right)/0.375\right\}\right\}\right\}, \quad (2)$$
$$0 \leq i < N_c$$

Then, the voice metric module 137 calculates the voice metrics from the channel SMR, $\sigma_q(i)$, using a look-up table in accordance with EQ 3. The look-up table is predetermined and charts channel SNR versus voicing level. In general, the larger the SNR, the larger the voicing level.

$$v(m) = \sum_{i=0}^{N_c-1} V(\alpha_q(i)) \quad (3)$$

During operation, the channel energy estimator 115 estimates a channel noise energy, and the channel SNR estimator 135 estimates a channel SNR from the estimated channel energy and a noise channel energy provided by the background noise estimator 125. The voice metric module 137 calculates a voice metric from the channel SNR which determines a voicing level of the signal. The voice metric is one criterion used for detecting the presence of noise. The noise update decision module 130 declares the presence of noise if the voice metric is less than a voice level threshold. Upon detecting noise, the noise update decision module 130 informs the background noise estimator 125 to update the noise channel energy. More specifically, the noise update decision module 130 keeps track of a number of noise update requests through an update-flag 131. When the number of update_flags 131 exceed a threshold, the noise channel energy is updated. The noise update decision module 130 may also declare the presence of noise if the peak-to-peak energy difference $\Delta_{P\text{-}P}(m)$ (See method step 220 of FIG. 3) and the spectrum deviation $\Delta_E(m)$(See method step 230 of FIG. 3) are both less than a respective threshold.

Recall from FIG. 7, that the peak-to-peak energy difference $\Delta_{P\text{-}P}(m)$ of a speech spectrum 330 is significantly larger that a peak-to-peak energy difference of a noise spectrum 300. More specifically, there is usually a large energy difference between the maximum energy channel 335 and minimum energy channel 340, while this difference is usually little when input signal is just noise. Using such characteristics, the peak-to-peak detector 123 calculates the peak-to-peak energy difference $\Delta_{P\text{-}P}(m)$ as follows $$\Delta_{P\text{-}P}(m) = \max(10 \log_{10}(E_{ch}(m,i))) - \min(10 \log_{10}(E_{ch}(m,i)))C_{low} \leq i \leq C_{high} \quad (11)$$

The peak-to-peak energy difference $\Delta_{P\text{-}P}(m)$ is only calculated when the signal energy is higher than a threshold: min $(E_{ch}(m,i)) \geq$ ENG_THLD Under an assumption that the input signal has gone through a high pass filter, $C_{low}$ and $C_{High}$ are selectively chosen as user input parameters when searching for the minimum value, The peak-to-peak detector 123 also low pass filters (e.g. smooths) the peak-to-peak energy difference $\Delta_{P\text{-}P}(m)$ with a previous result to reduce channel variation in accordance with EQ 12.

$$\Delta_{P\text{-}P}(m) = \Delta_{P\text{-}P}(m-1)*\beta + \Delta_{P\text{-}P}(m)*(1-\beta) \quad (12)$$

The spectrum deviation $\Delta_E(m)$ (See FIGS. 8 and 9) is defined as the sum of the absolute value of the difference between average long-term channel energy $\overline{E}_{dB}(m)$ and current channel energy $10\log_{10}(E_{ch}(m,i))$ as shown in EQ 4.

$$\Delta_E(m) = \sum_{i=0}^{N_c-1} |10\log_{10}(E_{ch}(m,i)) - \overline{E}_{dB}(m,i)| \qquad (4)$$

The average long-term channel energy $\overline{E}_{dB}(m)$ used in EQ 4 is shown in EQ 5.

$$\overline{E}_{dB}(m+1,i) = \alpha(m)\overline{E}_{dB}(m,i) + (1-\alpha(m))E_{dB}(m,i),$$
$$0 \leq i \leq N_c \qquad (5)$$

The exponential windowing factor $\alpha(m)$ used in EQ 5 is a function of the total channel energy as shown in EQ 6.

$$\alpha(m) = \alpha_H - \left(\frac{(\alpha_H - \alpha_L)}{(E_H - E_L)}(E_H - E_{tot}(m))\right) \qquad (6)$$

Upon the voice metric module 137 calculating the voice metrics, the peak-to-peak detector 123 calculating the peak-to-peak energy differences, and the spectral deviation estimator 120 calculating the spectrum deviation, a noise update can be determined. In particular, the noise update decision unit 130 receives the voice metric, peak-to-peak energy difference, and spectrum deviation to update a noise frame count. The noise update decision unit 130 employs decision logic that evaluates these criterion to determine if noise is present and if the noise estimate should be updated.

The following pseudo code used in the noise update logic illustrates how the noise update decision unit 130 evaluates the voice metrics v(m), peak-to-peak energy difference $\Delta_{P-P}(m)$, and spectrum deviation $\Delta_E(m)$, and a hysteresis logic to increment a noise update update_cnt. The update_flag identifies when a noise update will be performed and the frames of the signal used for updating the noise channel energy. Moreover, the background noise estimator 125 will only set the update_flag true to update the noise estimate when the update_cnt exceeds a predetermined threshold. More specifically, the noise decision update unit 130 counts a number of noise update requests thereby producing an update count, and updates a noise channel energy if the update count is greater than an update count threshold.

The noise update logic below as modified with the peak-to-peak energy difference criteria and the spectrum deviation $\Delta_E(m)$ can further update update_cnt in response to abrupt noise.

```
if ( (v(m) ≦ UPDATE_THLD ){
    update_flag = TRUE
    update_cnt = 0
}
else if ((( E_tot > NOISE_FLOOR ) and ( Δ_E(m) < DEV_THLD ) or
    (( E_tot > NOISE_FLOOR )and( Δ_E(m) < p * DEV_THLD )and
    (Δ_P-P(m) < PP_THLD)))
    update_cnt = update_cnt + 1
    if ( update_cnt ≧ UPDATE_CNT_THLD )
        update_flag = TRUE
}
``` where p is a value that larger than 1, and PP_THLD is the threshold. With this logic, when both v(m) and $\Delta_E(m)$ surpass the threshold, the noise update decision unit 130 will also check the $\Delta_{P-P}(m)$. If $\Delta_{P-P}(m)$ is less than the threshold, the frame is identified as noise. Notably, the underlined section identifies the first criteria $\Delta_E(m)<p*\text{DEV\_THLD}$ and the second criteria $(\Delta_{P-P}(m)<\text{PP\_THLD})$ implemented by the noise update decision logic to increment update_count. Furthermore, the update_flag can be set true only when the total signal energy is greater than a noise floor. The following values were assigned to the free parameters ENG_THLD=16, $C_{low}$=3, $C_{high}$=15, β=0.65, p=3, PP_THLD=15, The adaptive NS 100 functions well when the noise spectrum can be accurately estimated. Accordingly, the update_flag decision logic is critical for the noise estimation. As illustrated above in the pseudo code, the modified update logic is based on voice metrics v(m), peak-to-peak energy difference $\Delta_{P-P}(m)$, and the spectrum deviation $\Delta_E(m)$. When v(m) is less than a certain threshold, $\Delta_E(m)$ is less than an predetermined threshold, and the spectrum deviation is less than a predetermined threshold the signal is considered noise. As a result of the additional criteria in the noise update logic, the adaptive NS 100 will work well for stationary noise, slow varying non-stationary noise, and also fast-changing abrupt noise.

Figure 10:
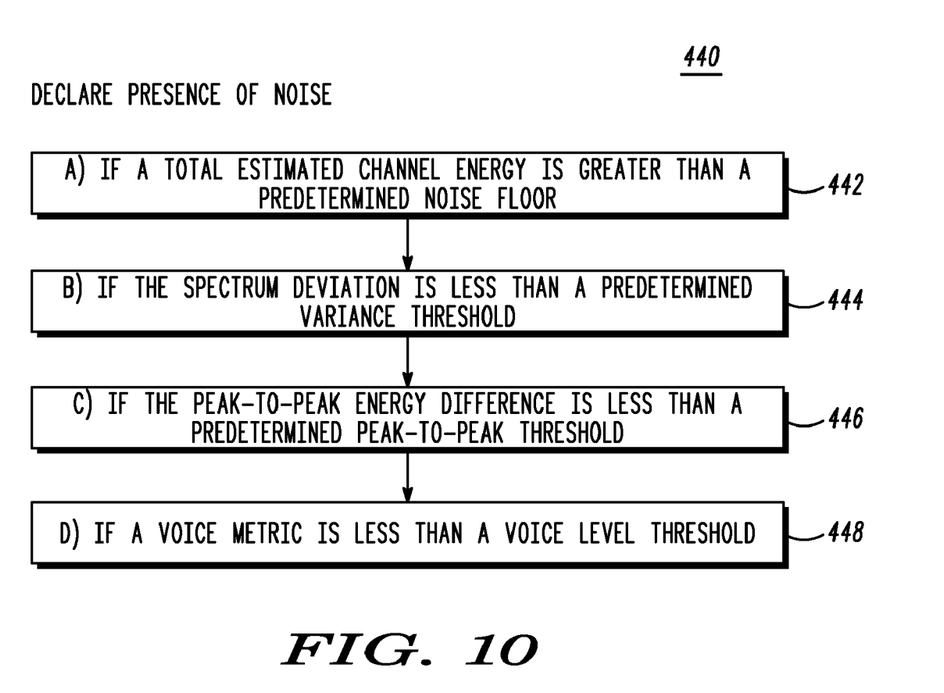
FIG. 10 identifies noise update criteria for updating a channel noise estimate in accordance with the embodiments of the invention.

Referring to FIG. 10, the criteria for declaring the presence of noise for updating a noise channel estimate are listed (440). The noise update decision unit 130 declares a presence of noise and requests a noise channel estimate update if a) a total estimated channel energy is greater than a predetermined noise floor (442), and b) the spectrum deviation is less than a predetermined variance threshold (444), and c) the peak-to-peak energy difference is less than a predetermined peak-to-peak threshold (446). The noise update decision unit 130 may also declare the presence of noise if only the voice metric is less than a voice level threshold (448); that is, criteria 448 can stand alone for updating the noise channel estimate.

The following pseudo code shows the hysteresis logic to prevent long-term rising of update_cnt.

```
if ( update_cnt == last_update_cnt )
    hyster_cnt = hyster_cnt + 1
else
    hyster_cnt = 0
    last_update_cnt = update_cnt
if ( hyster_cnt > HYSTER_CNT_THLD )
    update_cnt = 0
```

Briefly, when update_flag is set to true, the background noise estimator updates the noise channel estimate. The channel SNR estimator 135 then uses the update noise estimate to calculate the channel SNRs. The Channel SNR modifier 139 then uses the channel SNRs to determine gain adjustments to the frequency representation G(k) of the signal. The channel gain module 140 then applies the gain factors in accordance with the gain adjustments. More specifically, the channel SNR modifier 139 computes the overall gain factor $\gamma_n$ for each of the energy channels in the current frame as:

$$\gamma_n = \max\left\{\gamma_{min}(m), -10\log_{10}\left(\frac{1}{E_{floor}}\sum_{i=0}^{N_c-1} E_n(m,i)\right)\right\}, \qquad (8)$$

Where $E_{floor}$ is the noise floor energy, and $E_n(m)$ is the estimated noise spectrum. The individual channel gains are then calculated (in dB) as:

$$\gamma_{dB}(i) = \mu_g(m)(\sigma_q''(i) - \sigma_{th}) + \gamma_n, \quad 0 \leq i < N_c \qquad (9)$$

Where $\sigma_q''(i)$ is the modified noise estimation, $\sigma_{th}$=6

The channel gain module 140 then applies the channel gains to the transformed input signal G(k):

$$H(k) = \begin{cases} \gamma_{ch}(i)G(k), & f_L(i) \le k \le f_H(i), 0 \le i < N_c \\ G(k), & 0 \le k < f_L(0), f_H(N_c-1) < k \le M/2 \end{cases} \quad (10)$$

The time domain converter 150 then performs an inverse FFT on the noise-suppressed energy channels of the signal.

Figure 11:
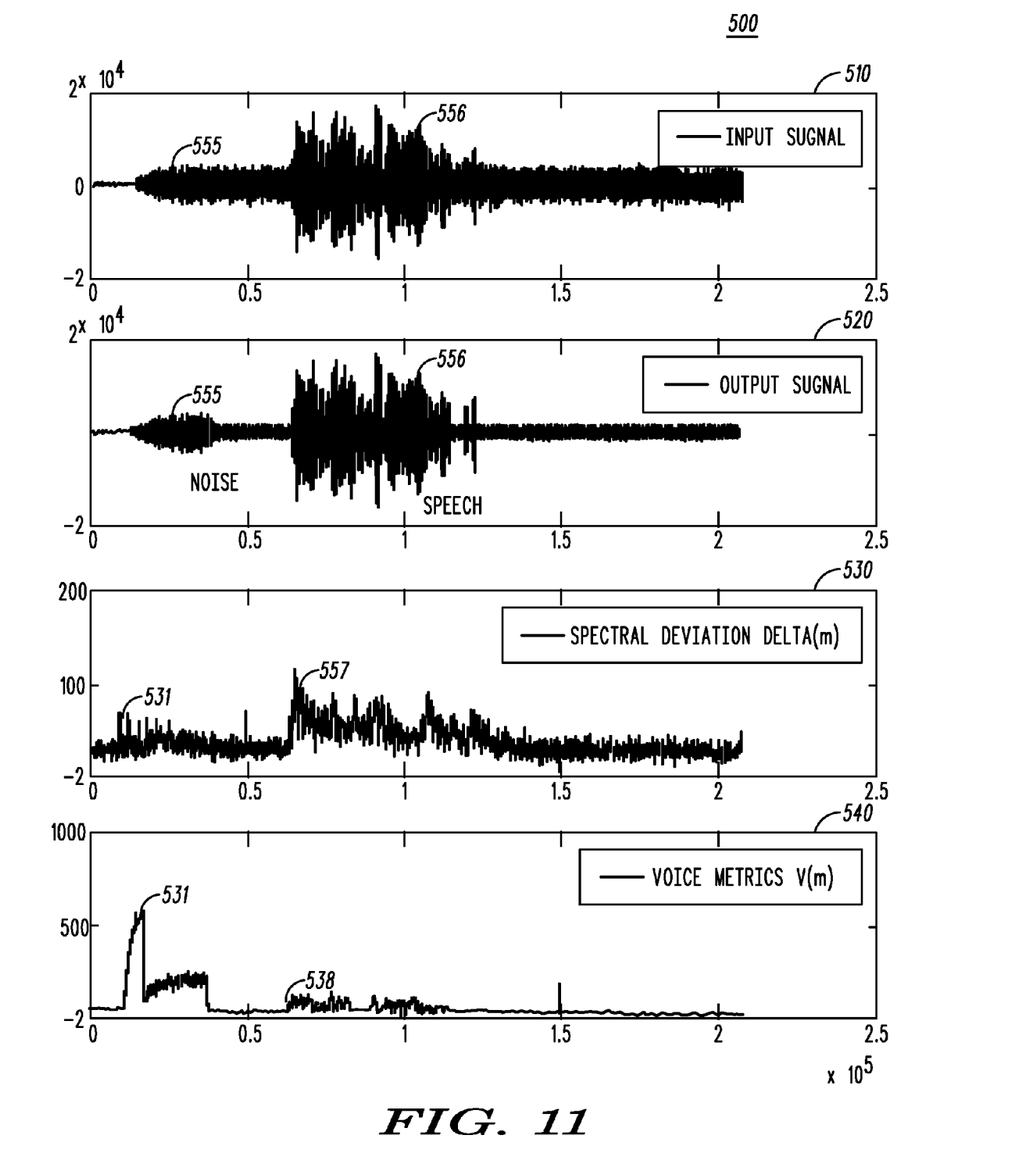
FIG. 11 is a simulation result of the adaptive noise suppressor that does not use the criteria of FIG. 10 in a noise update logic in accordance with the embodiments of the invention.
Figure 12:
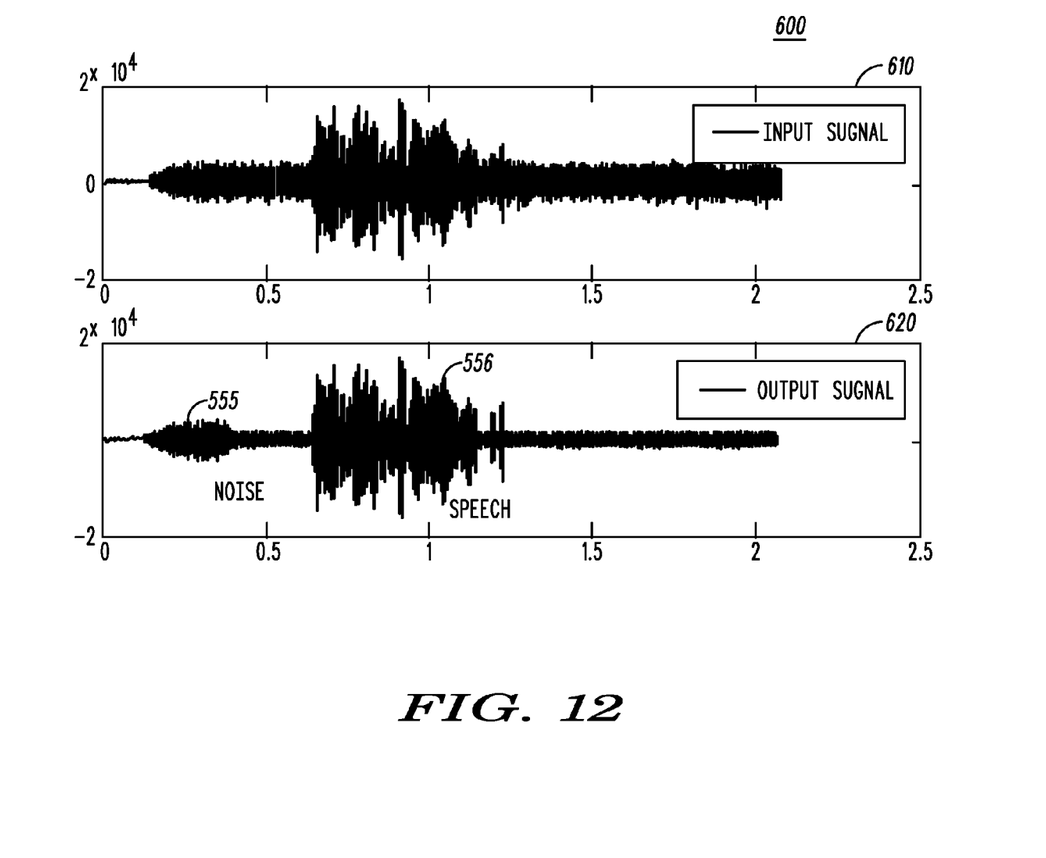
FIG. 12 is a simulation result of the adaptive noise suppressor that uses the criteria of FIG. 10 in a noise update logic for suppressing abrupt noise in accordance with the embodiments of the invention.

Referring to FIG. 11, simulation results of the adaptive filter 100 without the modified noise update logic is shown (e.g. peak-to-peak energy difference $\Delta_{P\text{-}P}(m)$, and the spectrum deviation $\Delta_E(m)$). Briefly, simulation results of the adaptive filter 100 with the modified noise update logic are shown in FIG. 12. In FIG. 11, subplot 510, a noisy input signal is shown. The noisy input signal consists of an abrupt onset of noise 555 followed by speech 556. As shown in subplot 520, the output signal of the adaptive NS 100 representing the noise suppressed input signal 510 is shown. Notably, the adaptive NS 100 is unable to suppress the initial onset of noise 555. Consequently, the noise will be momentarily heard at the beginning. The adaptive NS 100 will be able to suppress the noise shortly after the abrupt onset. In subplot 530, the spectral deviation of the input signal 510 is shown. Notably, the spectral deviation 531 at the onset of noise is significantly less than the spectral deviation 557 at the onset of speech. In subplot 540, the calculated voice metrics for the input signal are shown. The voice metric for the onset of abrupt noise 532 is significantly higher than the onset of speech 558. Notably, with respect to subplot 520, the adaptive NS 110 is unable to sufficiently suppress the abrupt noise 555 without use of the peak-to-peak energy differences to identify the abrupt onset of noise 555.

Referring to FIG. 12, simulation results of the adaptive NS 100 using the modified decision noise update decision logic (e.g. peak-to-peak energy difference $\Delta_{P\text{-}P}(m)$, and the spectrum deviation $\Delta_E(m)$) are shown. The results indicate that the adaptive NS 100 can sufficiently suppress the onset abrupt noise. Subplot 610 shows the input noisy signal having a noise component 555 and a speech component 557. Subplot 620, shows the noise suppressed output signal. Notably, the onset abrupt noise 555 in FIG. 11 is absent in FIG. 12 due to the more aggressive noise suppression, due to the modified decision logic. In particular, the adaptive NS 100 can suppress the onset abrupt noise 555 without affecting the integrity of the speech signal 555. In such regard, the adaptive filter 100, in accordance with the method 200 described in FIG. 3, advantageously employs the voice metrics, the spectrum deviations, and the peak-to-peak energy differences to identify the abrupt onset of noise 555, update the noise channel estimate, and suppress the abrupt noise with the updated noise channel estimate to produce noise suppressed speech.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for detecting noise in a signal, the method suitable for use in a spectral subtraction based noise suppressor, the method comprising:
   estimating a subband energy for a plurality of subbands of the signal to produce an estimated channel energy over a pre-specified time window;
   calculating a peak-to-peak energy difference between a maximum subband energy and a minimum subband energy among the plurality of subbands;
   calculating a spectrum deviation of the signal as a difference between the estimated channel energy and a long-term channel energy; and
   declaring a presence of noise and requesting a noise channel estimate update if a) a total estimated channel energy is greater than a predetermined noise floor, b) the spectrum deviation is less than a predetermined variance threshold, and c) the peak-to-peak energy difference is less than a predetermined peak-to-peak threshold.

2. The method of claim 1, further comprising:
   estimating a channel noise energy;
   estimating a channel SNR from the estimated channel energy and the channel noise energy;
   calculating a voice metric from the channel SNR, wherein the voice metric identifies a level of voicing; and
   declaring the presence of noise if d) the voice metric is less than a voice level threshold.

3. The method of claim 2, further comprising:
   counting a number of noise update requests thereby producing an update count; and
   updating a noise channel energy if the update count is greater than an update count threshold.

4. The method of claim 3, further comprising perform a hysteresis on the update count to prevent a rise of the update count over time.

5. The method of claim 1, wherein the estimating a subband energy further comprises:
   performing a Fast-Fourier transform (FFT) on the signal to produce a frequency spectrum with a plurality of frequency bins;
   categorizing the frequency bins into a plurality of energy channels; and
   calculating a mean magnitude (dB) for frequency bins within each channel to produce a subband energy (dB) for each channel.

6. The method of claim 5, wherein the categorizing produces channels that approximate non-overlapping critical bands.

7. The method of claim 5, further comprising applying an exponentially weighted low-pass filter to the plurality of channels over time to smooth the estimated channel energy.

8. The method of claim 5, wherein the step of calculating a spectrum deviation further comprises:
   calculating an absolute difference between an average long-term channel energy (dB) and a current channel energy (dB) for each channel;
   summing the absolute differences for the plurality of channels to produce the spectrum deviation.

9. The method of claim 8, further comprising applying an exponential windowing factor to the average long-term channel energy over time to smooth the spectrum deviation.

10. The method of claim 1, wherein the calculating a peak-to-peak energy difference further comprises:
   identifying a maximum subband channel energy (dB);
   identifying a minimum subband channel energy; and
   subtracting the minimum subband channel energy from the maximum subband channel energy to produce the peak-to-peak energy difference.

11. The method of claim 1, further comprising:
   estimating a channel SNR from the estimated channel energy and the a noise channel energy; and
   applying a spectral gain scaling to the estimated channel energy in accordance with the SNR to suppress the noise.

12. The method of claim 1, wherein the spectral subtraction based noise suppressor is integrated in an enhanced variable rate coder (EVRC) and complies with an IS-95x CDMA interface.

13. An apparatus for detecting noise in a signal, the apparatus comprising:
   a frequency domain converter that represents the signal as a plurality of energy channels in a frequency domain of the signal;
   a channel energy estimator operatively coupled to the frequency domain converter that produces an estimated channel energy for the plurality of energy channels;
   a peak-to-peak detector operatively coupled to the channel energy estimator that calculates a peak-to-peak energy difference between a maximum subband energy and a minimum subband energy of the estimated channel energy;
   a spectral deviation estimator operatively coupled to the channel energy estimator that calculates a spectrum deviation of the signal as a difference between a long-term channel energy and the estimated channel energy;
   a background noise estimator cooperatively coupled to the channel energy estimator that estimates a noise channel energy; and
   a noise update detector operatively coupled to the spectral deviation estimator and cooperatively coupled to the channel energy estimator that declares the presence of noise based on the peak-to-peak energy difference and the spectral deviation.

14. The apparatus of claim 13, wherein the noise update detector updates a channel noise energy if a) a total estimated channel energy is greater than a predetermined noise floor, b) the spectrum deviation is less than a predetermined variance threshold, and c) the peak-to-peak energy difference is less than a predetermined peak-to-peak threshold.

15. The apparatus of claim 13, further comprising:
   a channel signal-to-noise (SNR) ratio estimator operatively coupled to the channel energy estimator, the background noise estimator, and the noise update detector that estimates a SNR from the estimated channel energy and the noise channel energy;
   a channel gain module cooperatively coupled to the channel (SNR) ratio estimator and the background noise estimator that applies a spectral gain scaling to the plurality of channels in accordance with the SNR to suppress the noise; and
   a time domain converter operatively coupled to the channel (SNR) ratio estimator and the frequency domain converter that converts the plurality of channels that have been gain-scaled to a time domain signal.

16. The apparatus of claim 15, further comprising:
   a voice metric module operatively coupled to the channel SNR estimator that determines a voicing level of the signal; and
   a channel SNR modifier operatively coupled to the voice metric module and the channel gain module that determines the spectral gain scaling in view of the voicing level,
   wherein the noise update detector declares the presence of noise if d) the voice metric is less than a voice level threshold.

17. The apparatus of claim 15, wherein the frequency domain converter performs a Fast-Fourier Transform (FFT) on the signal to produce a signal spectrum, the channel energy estimator performs a filter-bank operation on the signal spectrum to calculate an estimated channel energy, the channel gain module applies a gain scaling to each channel of the estimated channel energy in view of the peak-to-peak difference and spectral deviation, and the time domain converter performs an inverse FFT to produce a noise suppressed signal.

18. The method of claim 13, wherein the channel energy estimator generates a speech-to-noise ratio between the maximum subband energy and the minimum subband energy, wherein a low ratio indicates an absence of speech.

19. The method of claim 13, wherein the spectral deviation estimator identifies abrupt changes in a spectrum of the noise.

20. A method for detecting noise in a signal suitable for use in a spectral subtraction based noise suppressor, the method comprising:
   estimating a subband energy of a frame of the signal to produce an estimated channel energy for a plurality of subbands within the frame;
   calculating a spectrum deviation of the signal as a difference between the estimated channel energy and a long-term channel energy;
   evaluating a ratio between a maximum subband energy and a minimum subband energy of the estimated channel energy;
   incrementing a noise update count if the ratio is less than a predetermined threshold and the spectrum deviation is less than a deviation threshold; and
   updating a channel noise energy if the noise update count is greater than an update count threshold.

* * * * *